(12) United States Patent
Goldfarb

(10) Patent No.: US 9,154,640 B2
(45) Date of Patent: Oct. 6, 2015

(54) METHODS AND SYSTEMS FOR MASS LINK ANALYSIS USING RULE ENGINES

(75) Inventor: Eithan Goldfarb, Ness Ziona (IL)

(73) Assignee: VERINT SYSTEMS LTD., Herzelia, Pituach (IL)

( * ) Notice: Subject to any disclaimer, the term of this patent is extended or adjusted under 35 U.S.C. 154(b) by 730 days.

(21) Appl. No.: 12/964,891

(22) Filed: Dec. 10, 2010

(65) Prior Publication Data

US 2011/0142217 A1   Jun. 16, 2011

(30) Foreign Application Priority Data

Dec. 10, 2009   (IL) .......................................... 202686

(51) Int. Cl.
*H04M 15/00* (2006.01)

(52) U.S. Cl.
CPC .............. *H04M 15/41* (2013.01); *H04M 15/00* (2013.01); *H04M 15/58* (2013.01)

(58) Field of Classification Search
USPC .......... 379/111–141, 88.11, 373.03, 145, 189
See application file for complete search history.

(56) References Cited

U.S. PATENT DOCUMENTS

| | | | |
|---|---|---|---|
| 5,689,442 | A | 11/1997 | Swanson et al. |
| 6,094,643 | A | 7/2000 | Anderson et al. |
| 6,404,857 | B1 | 6/2002 | Blair et al. |
| 6,718,023 | B1 | 4/2004 | Zolotov |
| 6,757,361 | B2 | 6/2004 | Blair et al. |
| 7,216,162 | B2 | 5/2007 | Amit et al. |
| 7,466,816 | B2 | 12/2008 | Blair |
| RE40,634 | E | 2/2009 | Blair et al. |
| 7,587,041 | B2 | 9/2009 | Blair |
| 2003/0229613 | A1* | 12/2003 | Zargham et al. .................. 707/1 |
| 2008/0014873 | A1 | 1/2008 | Krayer et al. |
| 2008/0104084 | A1 | 5/2008 | Chavda et al. |
| 2008/0261192 | A1 | 10/2008 | Huang et al. |
| 2008/0285464 | A1 | 11/2008 | Katzir |
| 2009/0163183 | A1* | 6/2009 | O'Donoghue et al. .... 455/414.1 |

FOREIGN PATENT DOCUMENTS

EP   1230606   8/2002

OTHER PUBLICATIONS

"Graph-Based Technologies for Intelligence Analysis" by T. Coffman, S. Greenbelt CACM, Mar. 2004.*

Liu, Rong-Tai, et al., "A Fast Pattern-Match Engine for Network Processor-based NIDS," Proceedings of the 20th International Conference on Information Technology (ITCC'04), Dec. 5, 2006, 23 pages.

(Continued)

*Primary Examiner* — Yosef K Laekemariam
(74) *Attorney, Agent, or Firm* — Meunier Carlin & Curfman

(57) ABSTRACT

A substantially real-time graph-based rule engine that analyzes connectivities, both direct and indirect relationships, between entities stored in a database as the database is updated (e.g., with CDR or financial transaction data). The rule engine uses pre-defined rules to detect events (i.e., the database updates) that influence the relationship between entities in the database. When the database is updated with events (e.g., CDRs), the real-time rule engine compares the update to any relevant rules. If the real-time based rule engine finds a match between a rule and an update to the database, then the rule engine generates a notification, such as an alert. The alerts may be used to provide notification of, e.g. fraudulent activities.

20 Claims, 2 Drawing Sheets

(56) References Cited

OTHER PUBLICATIONS

Rohde & Schwarz GmbH & Co. KG, "ACCESSNET-T, DMX-500 R2, Digital Mobile eXchange," Product Brochure, Secure Communications, Mar. 2000, 4 pages.
Rohde & Schwarz GmbH & Co. KG, "ACCESSNET-T IP," Product Brochure, Secure Communications, Jan. 2000, 4 pages.
Rohde & Schwarz GmbH & Co. KG, "R&S AllAudio Integrierte digitale Audio-Software," Product Brochure, Feb. 2002, 12 pages.
Rohde & Schwarz GmbH & Co. KG, "R&S AllAudio Integrated Digital Audio Software," Product Brochure, Radiomonitoring & Radiolocation, Feb. 2000, 12 pages.
Rohde & Schwarz GmbH & Co. KG, "The R&S AMMOS GX430 PC-Based Signal Analysis and Signal Processing Standalone software solution," http://www2.rohde-schwarz.com/en/products/radiomonitoring/Signal_Analysis/GX430, Jul. 30, 2010, 1 page.
Rohde & Schwarz GmbH & Co. KG, "R&S AMMOS GX425 Software," http://www2.rohde-schwarz.com/en/products/radiomonitoringlSignal_Analysis/GX425, Jul. 30, 2010, 1 page.
Rohde & Schwarz GmbH & Co. KG, "R&S RAMON COMINT/CESM Software," Product Brochure, Radiomonitoring & Radiolocation, Jan. 2000, 22 pages.
Rohde & Schwarz GmbH & Co. KG, "R&S TMSR200 Lightweight Interception and Direction Finding System," Technical Information, Aug. 14, 2009, 8SPM-ko/hn, Version 3.0, 10 pages.
Rohde & Schwarz GmbH & Co. KG, "Digital Standards for R&S SMU200A, R&S SMATE200A, R&S SMJ100A, R&S SMBV100A and R&S AMU200A," Data Sheet, Test & Measurement, May 2000, 68 pages.
Rohde & Schwarz GmbH & Co. KG, "R&S RA-CM Continuous Monitoring Software," Product Brochure, Radiomonitoring & Radiolocation, Jan. 2001, 16 pages.
Rohde & Schwarz GmbH & Co. KG, "Integrated Digital Audio Software R&S AllAudio," Specifications, 8 pages, May 28, 2015.
Metronome SSL Inspector Solution Overview White Paper, "Examining SSL-encrypted Communications," 2010, 8 pages.
Dharmapurikar, Sarang, et al., "Fast and Scalable Pattern Matching for Network Intrusion Detection Systems," IEEE Journal on Selected Areas in Communications, Oct. 2006, vol. 24, Issue 10, pp. 1781-1792.
Fisk, Mike, et al., "Applying Fast String Matching to Intrusion Detection," Los Alamos National Laboratory and University of California San Diego, 22 pages, May 28, 2015.
Fox Replay BV, "FoxReplay Analyst," http//www.foxreplay.com, Revision 1.0, Nov. 2007, 5 pages.
Fox-IT BV, "FoxReplay Analyst," Product Brochure, http//www.foxreplay.com, 2 pages, May 28, 2015.
Aho, Alfred V., et al., "Efficient String Matching: An Aid to Bibliographic Search," Communication of the ACM, Jun. 1975, vol. 18, No. 6, pp. 333-340.
Coffman, T., et al., "Graph-Based Technologies for Intelligence Analysis," CACM, Mar. 2004, 12 pages.
Cloudshield, Inc., "Lawful Intercept Next-Generation Platform," 2009, 6 pages.
Goldfarb, Eithan, "Mass Link Analysis: Conceptual Analysis," 2006, Version 1.1, 21 pages.
Verint Systems Inc., "Mass Link Analysis: Solution Description," Dec. 2008, 16 pages.
High-Performance LI with Deep Packet Inspection on Commodity Hardware, ISS World, Singapore, Jun. 9-11, 2008, Presenter: Klaus Mochalski, CEO, ipoque, 25 pages.
Pan, Long, "Effective and Efficient Methodologies for Social Network Analysis," Dissertation submitted to faculty of Virginia Polytechnic Institute and State University, Blacksburg, Virginia, Dec. 11, 2007, 148 pages.
Schulzrinne, H., et al., "RTP: A Transport Protocol for Real-Time Applications," Standards Track, Jul. 2003, 89 pages.
Sheng, Lei, "A Graph Query Language and Its Query Processing," IEEE, Apr. 1999, pp. 572-581.
Soghoian, Christopher, et al., "Certified Lies: Detecting and Defeating Government Interception Attacks Against SSL," 19 pages, May 28, 2015.
Svenson, Pontus, "Social network analysis and information fusion for anti-terrorism," CIMI, 2006, 8 pages.
Tongaonkar, Alok S., "Fast Pattern-Matching Techniquest for Packet Filtering," Stony Brook University, May 2004, 44 pages.
Yu, Fang, et al., "Fast and Memory-Efficient Regular Expression Matching for Deep Packet Inspection," ANCS'06, Dec. 3-5, 2006, San Jose, California, 10 pages.
Yu, Fang, et al., "Gigabit Rate Packet Pattern-Matching Usint TCAM," Proceedings of the 12th IEEE International Conference on Network Protocols (ICNP'04) 10 pages, May 28, 2015.

\* cited by examiner

US 9,154,640 B2

METHODS AND SYSTEMS FOR MASS LINK ANALYSIS USING RULE ENGINES

FIELD OF THE DISCLOSURE

The present disclosure relates generally to data analysis, and particularly to analyzing relationship-related information.

BACKGROUND OF THE DISCLOSURE

As communication methods advance and multiply, there is a corresponding increase in the variety and quantity of information detailing communication traffic. Various techniques for analyzing and extracting useful information from communication traffic are known in the art. Some analysis techniques process communication traffic in order to identify and characterize relationships between users.

SUMMARY OF THE DISCLOSURE

An embodiment that is described herein provides a method, including at a first time, accepting a plurality of indications based on interaction among entities, each indication specifying that a respective pair of the entities are related, and constructing based on the indications a data structure representing relationships among respective pairs of the entities; at a second time subsequent to the first time, accepting one or more additional indications, and updating the relationships in the data structure based on the additional indications; and outputting a notification upon detecting that a rule, which is defined over the relationships and is not met at the first time, is met at the second time.

In some embodiments, the interaction includes communication among the entities over a communication network. Additionally or alternatively, the interaction includes financial transactions among the entities. In an embodiment, the indications include Call Detail Records (CDRs). In a disclosed embodiment, the entities include at least one entity type selected from a group of types consisting of an individual, a set of individuals, a communication terminal, a plurality of communication terminals, an organization, an e-mail address, a Web-site, a bank account and a home address. In another embodiment, updating the relationships in the data structure includes storing at least a portion of the data structure in Random Access Memory (RAM), and detecting that the rule is met includes querying at least the portion of the data structure in the RAM.

In some embodiments, the rule depends on a distance defined as a shortest sequence of interrelated entities that relate a first entity with a second entity. In an embodiment, detecting that the rule is met includes detecting a change in the distance resulting from an update in the relationships occurring between the first time and the second time. In another embodiment, the rule is defined with respect to one or more of the entities that are identified as suspects. The rule may identify a given entity as an additional suspect responsively to at least one relationship between the given entity and the suspects. Additionally or alternatively, the rule may identify a change in at least one relationship involving the suspects.

There is additionally provided, in accordance with an embodiment that is described herein, apparatus, including a memory and a rule processor, which is configured to accept, at a first time, a plurality of indications based on interaction among entities, each indication specifying that a respective pair of the entities are related, to construct based on the indications a data structure representing relationships among respective pairs of the entities, to accept, at a second time subsequent to the first time, one or more additional indications, to update the relationships in the data structure based on the additional indications, and to output a notification upon detecting that a rule, which is defined over the relationships and is not met at the first time, is met at the second time.

BRIEF DESCRIPTION OF THE DRAWINGS

The disclosure is herein described, by way of example only, with reference to the accompanying drawings, wherein.

DETAILED DESCRIPTION OF EMBODIMENTS

Figure 1:
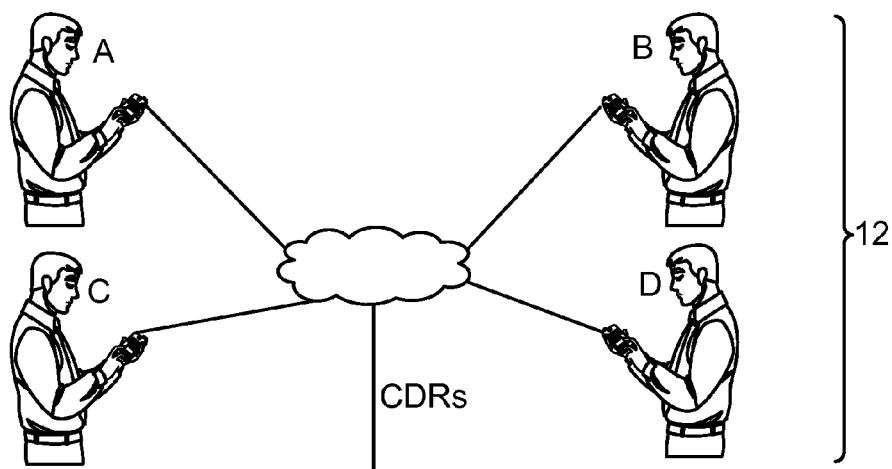
FIG. 1 is a block diagram that schematically illustrates a link analysis system operative to employ a rule engine module, in accordance with an embodiment of the present disclosure.
Figure 1:
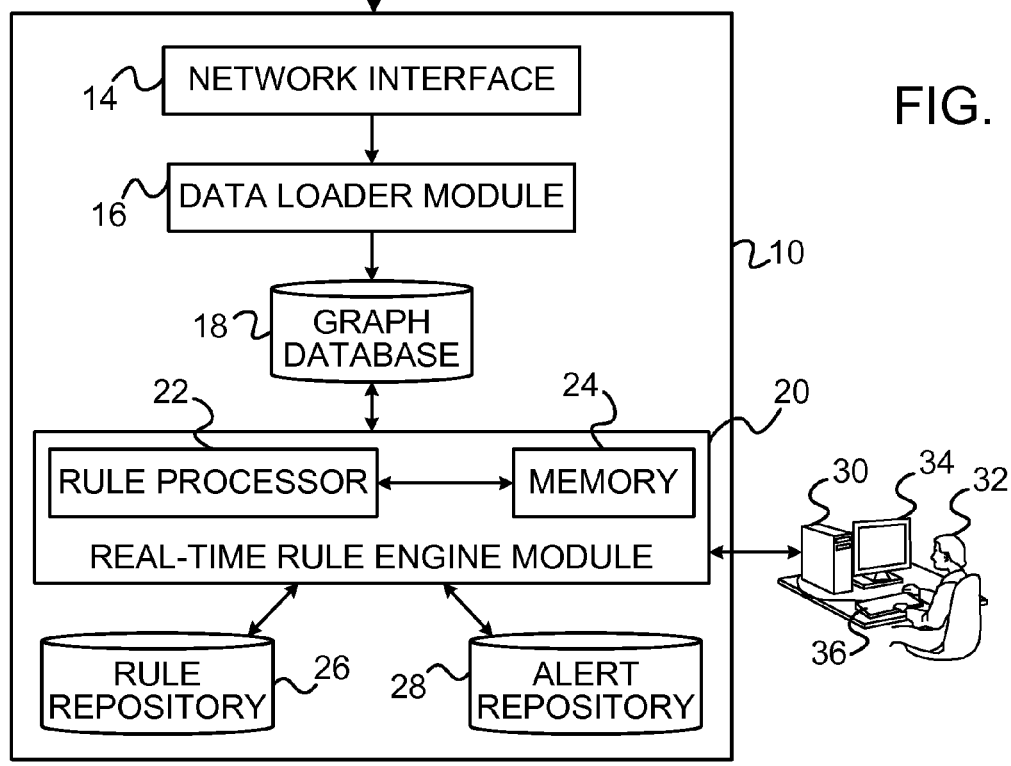

The following notation is used throughout the document:

| Term | Definition |
| --- | --- |
| ACH | Automated Clearing House |
| CDR | Call Detail Record |
| ID | Identification |
| IMEI | International Mobile Equipment ID |
| IMSI | International Mobile Subscriber ID |
| RADIUS | Remote Authentication Dial-In User Service |
| SMS | Short(or Silent) Message Service |
| VOIP | Voice Over Internet Protocol |

Overview

Some data analytics applications identify relationships among entities, and act upon the identified relationships. Entities may include individuals, groups, organizations and physical devices such as computers or cellular phones that interact over a communication network.

For example, a fraud detection system may identify a fraudulent user by discovering that this user interacts with other users who are already known as suspects. Changes in relationships (e.g., appearance of a new relationship, or a strengthening or weakening relationship) may also provide meaningful information. Relationships can be identified and characterized, for example, by analyzing communication sessions (e.g., phone conversations, emails or SMS messages) between the network users. Fraud detection systems can also be used to detect financial schemes such as money laundering by analyzing relationship data derived from financial transaction record data (e.g., checks, ACH transfers and wire transfers).

In many practical cases, identifying and acting upon relationships involves storage and processing of large volumes of data. Tracking relationships among users of a large cellular network, for example, may require processing of billions of Call Detail Records (CDRs) and keeping track of relationships among many thousands of users.

Recently, a storage efficient data structure suitable for large-scale link analysis of communications data was introduced, as described in an Israel Patent Application entitled "Methods for Large-Scale Link Analysis," filed Sep. 23, 2009, whose disclosure is incorporated herein by reference.

Although the embodiments described herein refer mainly to communication between communication network users, the disclosed techniques can be applied to various other kinds of relationships and interactions among entities, e.g., bank transactions, ownerships, kinship and other indications.

In embodiments of the present disclosure, a real-time graph-based rule engine analyzes connectivity (i.e., direct and indirect relationships) between entities stored in a database as the database is updated (e.g., with CDR or financial transaction data). The rule engine uses pre-defined rules to detect events (i.e., the database updates) that influence the relationship between entities in the database. When the database is updated with events (e.g., CDRs), the real-time rule engine compares the update to any relevant rules. If the real-time based rule engine finds a match between a rule and an update to the database, then the rule engine generates a notification, such as an alert.

In some embodiments of the present disclosure, the database is implemented as a graph database, which stores aggregated information about entities and the relationship between them. The graph database represents each entity as a node, where each node is directly "related" to one or more other nodes via edges. In the graph database, the number of edges (or nodes) along the shortest path connecting two nodes (i.e., vertices) is referred to as the "distance" between the nodes. In some embodiments of the present disclosure, entities are either primary entities or secondary entities. Primary entities are identity endpoints that hold detailed attributes such as email addresses and phone numbers. Secondary entities are also identity endpoints, which hold additional optional identifiers to the primary identifier, such as IMSI, IMEI or RADIUS usernames.

Tracking relationships can be accomplished by link analysis, which employs queries related to correlations or links between the different entities (e.g., direct or indirect participants in a communication). This is useful since suspects (represented as suspect entities) may avoid direct contact with one another, and instead communicate via intermediate entities (i.e., mediators), thereby increasing the distance between the suspect entities. By using link analysis, a real-time rule engine implementing an embodiment of the present disclosure may employ graph-based rules to identify new suspects (i.e., suspect entities) based on their connectivity (i.e., relationship) to a previously identified suspect. Other rules may detect activities or events of interest, which are reflected by change in distances between suspect entities, i.e., the length of the shortest path between the entities in the relationship graph. For example, the distance between two suspects may decrease due to the suspects communicating with a new person who is already connected to other suspects (a new mediator). Alternatively, the communication path between the suspects may be considered "broken" if there is no communication (direct or indirect) detected between the suspects for a period of time.

In some embodiments of the present disclosure, the graph database is implemented in primary storage (e.g., Random Access Memory—RAM), which is often referred to as an "in-memory database." The in-memory graph database enables ultra-fast response time for graph based queries.

Embodiments of the present disclosure enable real-time analysis of CDR data and real-time detection of potential new suspect entities. Graph-based rules can help identify new suspect entities based on their relationship to known suspect entities, and therefore assist in finding the "needle in a haystack." Graph-based rules implemented in embodiments of the present disclosure can perform operations such as (1) detecting all suspect entities that an entity is related to within a given distance, (2) detecting the shortest path between two entities to determine if there is a relationship between them within a given distance, (3) detecting similar entities (e.g., entities belonging to the same organization, or multiple entities associated with one suspect) by searching for unknown entities, which are within a given distance from other known suspect entities, or (4) by analyzing connection attributes to detect either a strengthening relationship (i.e., an increase in communication events between entities) or a loss of communication due to a communication path not being used for a specified time period. In the case of a loss of communication, the path can be removed from the database.

By using the real-time rule engines described herein, an operator can identify changes in relationships and other events of interest quickly and reliably. As a result, responsive actions can be initiated efficiently. The disclosed techniques are highly scalable, and are especially advantageous in large databases having large numbers of entities and relationships.

System Description

FIG. 1 is a block diagram that schematically illustrates a link analysis system 10 operative to employ a rule engine module 20, in accordance with an embodiment of the present disclosure. Link analysis system 10 identifies and acts upon relationships between users of a communication network 12. Systems of this sort can be deployed in various applications, such as fraud detection, anti-money laundering and crime investigation. Other usage examples comprise, for example, Web-page ranking schemes in search engines (e.g., schemes in which each Web-page is ranked based on the ranks of pages that point to it). In the present example, network 12 comprises a cellular network, and the figure shows four users denoted A, B, C and D. Alternatively, network 12 may comprise any other suitable wire-line or wireless communication network. The network typically serves a large number of users.

System 10 comprises a network interface 14, which receives from network 12 indications regarding communication sessions held between the users. In the example of FIG. 1, interface 14 receives Call Detail Records (CDRs) produced in network 12, although any other type of indications can also be used. Each indication indicates that two entities (users in the present example) are related. System 10 may comprise a data loader module 16, which distills the received data and updates the relationship-related data in a graph database 18. As discussed supra, database 18 may reside in primary (in-memory) storage in order to maximize performance.

Graph database 18 stores and organizes data as multiple entities, with each entity typically having at least one direct relationship to another entity (i.e., the two participants in a communication). In addition, entities may have one or more indirect relationships. For example, if entity A has a direct relationship with entity B, and entity B has a direct relationship with entity C, then entity A has an indirect relationship with entity C via entity B.

Each entity in graph database 18 typically stores a list of all directly connected entities and a list of all indirectly connected entities, including their respective distances, up to a defined maximum distance. Alternatively or additionally, the list may comprise any indirectly connected suspects with their respective distance (again, up to a defined maximum distance). Entities in graph database 18 may also store attributes and a relationship level that indicates the strength of relationship. Examples of relationship levels include (1) the number of transactions, (2) the amount(s) of money that was transferred, (3) the number of exchanged messages, (4) the rate (i.e., velocity) of communication events, and (5) the last interaction date. Relationship attributes may also be used by the graph-based rules.

A real-time rule engine module 20 comprises a rule processor 22 and a memory 24. Rule processor 22 retrieves rules stored in memory 24, and applies the rules to database 18. When data loader 16 updates database 18, rule processor 22 compares the update to any relevant rules.

Relevant graph-based rules may be triggered (i.e., checked against graph database 18 for a match) when there is a change in the graph topology, (e.g., when new connections are found, or when new entities are added to database 18). Since most events only update existing relationships, detecting any changes in graph topology is a valuable when implementing the real-time nature of system 10.

In embodiments of the present disclosure, there are two major types of rules: (1) rules that are applied when there is a change in the graph topology (e.g., a new relationship is added, an existing relationship expires, etc.), and (2) rules that are applied when an existing relationship attributes pass a predefined threshold (e.g., detecting either meaningful or expiring communications).

There is also an additional scenario when an entity is initially identified as a "suspect". Identifying a suspect entity can automatically trigger rule processor 18 to revise the list (stored in the suspect entity) of indirectly connected suspects, along with their respective distance (up to a specific distance). After updating the list, rule processor 18 compares the revised database to any relevant rules.

Returning to System 10, if rule processor 22 identifies a match between a rule and the update, it generates an alert. Typically, rule processor 22 sends the alert to a workstation 30, which presents the alert on a display 34 to an operator 32. The operator can immediately take any appropriate action in response to the alert. Alternatively or additionally, rule processor 22 can store the alert in an alert repository 28, thereby enabling operator 32 to query, prioritize and process the alerts via an input device 36 such as a keyboard or mouse. Alert repository 28 typically comprises a storage device such as a disk drive or other non-volatile storage.

In the embodiments described herein, rule processor 22 examines the updates applied to database 18, attempting to detect rule matching. Alternatively, however, the rule processor may scan the areas of the database that are affected by the updates, rather than only scanning the database updates.

Display 34 can also present a data entry screen, which operator 32 uses to enter graph-based rules into workstation 30, via input device 36. Workstation 30 sends the rules to rule engine module 20 for processing. In an embodiment of the present disclosure, workstation 30 stores all entered rules to both memory 24 which typically comprises volatile memory, and a rule repository 26 which typically comprises a storage device such as a disk drive or other non-volatile storage. Upon startup, link analysis system 10 loads the graph based rules from rule repository 26 to memory 24.

Typically, rule processor 22 comprises a general-purpose processor, which is programmed in software to carry out the functions described herein. The software may be downloaded to the processor in electronic form, over a network, for example, or it may, alternatively or additionally, be provided and/or stored on tangible media, such as magnetic, optical, or electronic memory.

In some embodiments of the present disclosure, operator 32 can add, modify or remove rules in real-time. Examples of scenarios which warrant adding rules to memory 24 (or to repository 26) may include, for example, (1) identifying internet cafés and other communication brokers by detecting a RADIUS username node that is directly related to a large number of other entities, (2) identifying a suspect entity that starts using a new email address, or a new SKYPE identifier, (3) detecting a new communication path between two suspect entities (e.g., suspects that start using pre-paid phones or anonymous email accounts), (4) detecting when a communication level between two suspects increases beyond a predefined threshold, (5) detecting a new direct relationship between two suspect entities and another previously-identified suspect entity, (6) determining that a previously identified relationship between two entities is no longer being used, (7) detecting that an entity is directly related to a threshold number of targets, indicating a possible communications broker (i.e., intermediary), and/or (8) detecting changes in distance between entities.

The system configuration shown in FIG. 1 is an example configuration, which is shown purely for the sake of conceptual clarity. In alternative embodiments, any other suitable configuration can also be used. The functions of system 10 may be integrated with various other analytics functions.

In some embodiments of the present disclosure, data loader module 16 distills and stores data in graph database 18, where relationship indications can be represented by a relationship graph, in which nodes represent entities and edges represent relationships.

Figure 2:
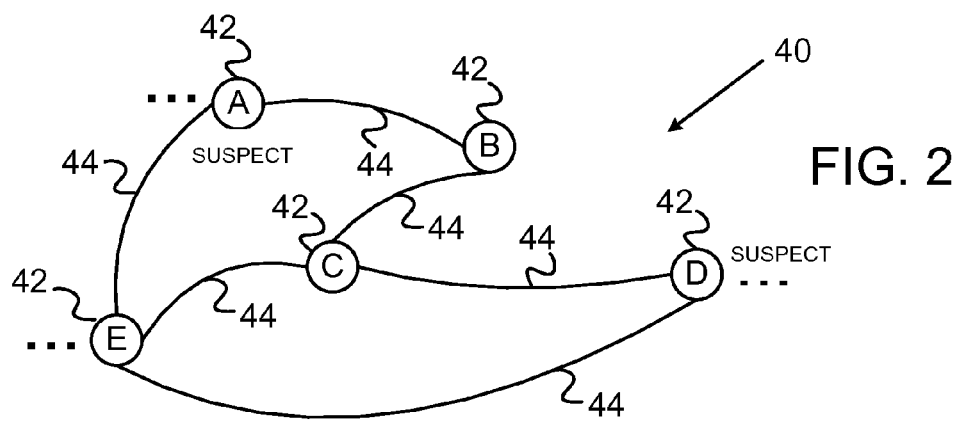
FIG. 2 is a diagram that schematically illustrates a relationship graph, in accordance with an embodiment of the present disclosure.

FIG. 2 is a diagram showing a relationship graph 40, in accordance with an embodiment of the present disclosure. Graph 40 comprises nodes 42 and edges 44. Each node 42 represents an entity. An edge 44 between two nodes corresponds to a relationship indication, i.e., specifies a relationship between the corresponding entities. In the present example, the relationships are symmetric, and the graph edges are therefore not directed.

The example of FIG. 2 shows a simple graph representing only five entities and six relationships for the sake of clarity. In practice, however, relationship graphs in real-life applications may comprise millions of entities (nodes) and relationships (edges). In some embodiments, data loader module 16 may accept a relationship graph as input. Alternatively, data loader module 16 may produce a relationship graph based on CDRs or other information received from network 12. Techniques for generating relationships are described, for example, by Svenson et al., in "Social Network Analysis and Information Fusion for Anti-Terrorism," Proceedings of the Conference on Civil and Military Readiness (CIMI), Enkoping, Sweden, May 16-18, 2006, by Pan, in "Effective and Efficient Methodologies for Social Network Analysis," PhD Thesis submitted to Virginia Polytechnic Institute and State University, Dec. 11, 2007, and by Coffman et al., in "Graph-Based Technologies for Intelligence Analysis," Communications of the ACM (CACM), volume 47, issue 3, March 2004, pages 45-47, which are all incorporated herein by reference.

In relationship graph 40, entities A and D are identified as suspects. The minimum distance between suspect entities A and D is two, via mediator entity E. As discussed supra, suspects may avoid direct contact with one another, and instead communicate via mediator entities, thereby decreasing or increasing the distance between the suspect entities. In an example scenario, a decrease in the distance between entities may indicate a suspicious event. Thus, an example rule may attempt to detect a decrease in the distance between two entities. In graph 40, for example, entities A and D may be initially connected via entities B and C. At that point in time, entity E is not part of the graph, and the distance between entities A and D is 3. At a later time, entity E is found to interact with both entities A and D, thereby shortening the distance between them to 2. Once suspect entities are identified, a graph-based rule implementing an embodiment of the present disclosure can analyze activities of interest between nodes A and D. Activity may be via mediator node E, or via another path connecting the suspect entities (e.g., via entities B and C).

In some embodiments, database 18 stores a single record for each entity, referred to as an entity record. The record of a given entity indicates the entities that are related to the given entity. The entities (nodes) related to a given entity (node) are also referred to as linked entities (linked nodes). A database of this sort is described in the Israel Patent Application "Methods for Large-Scale Link Analysis," cited above.

Real-Time Relationship Evaluation

Figure 3:
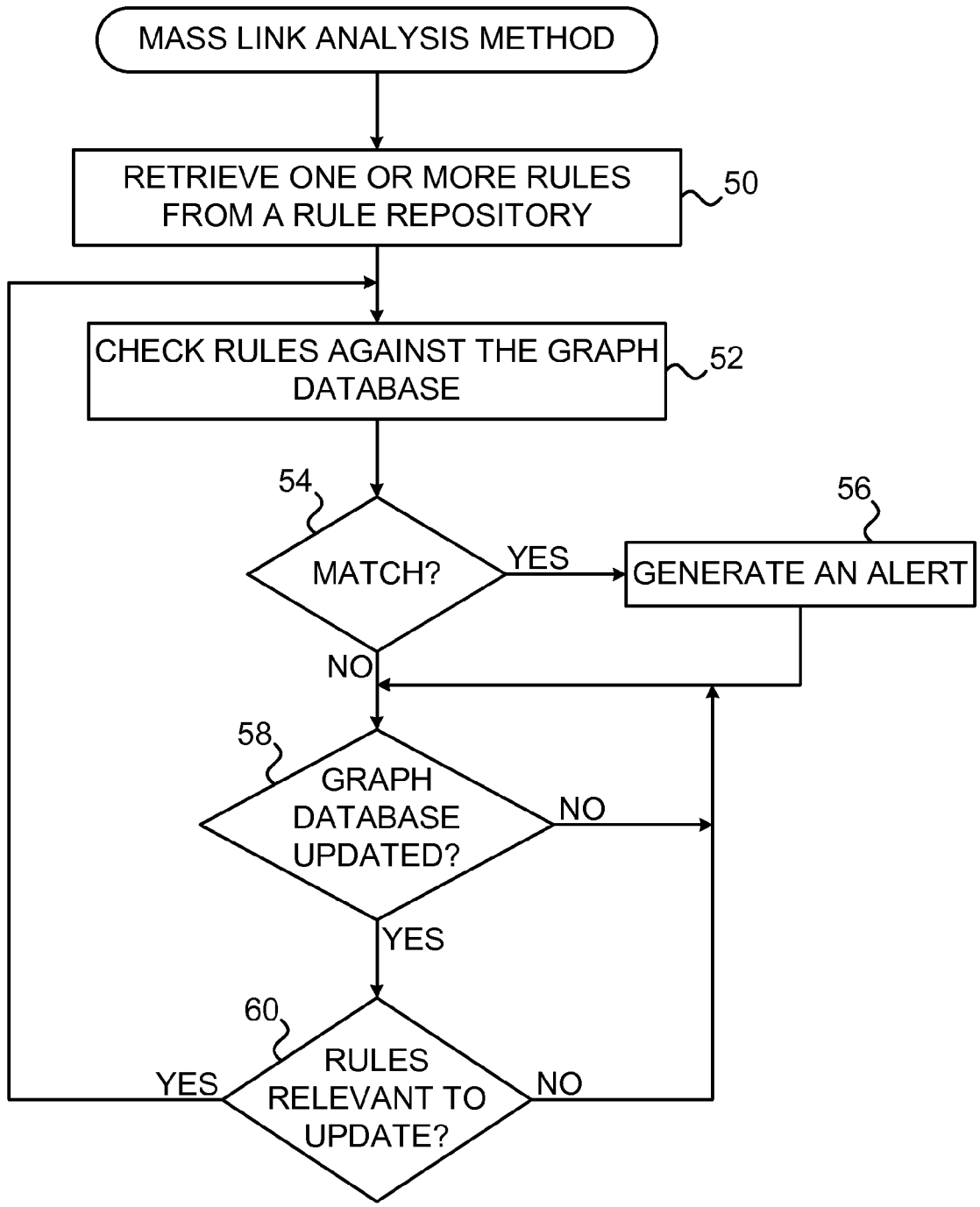
FIG. 3 is a flow diagram that schematically illustrates a method for real-time relationship evaluation, in accordance with an embodiment of the present disclosure.

FIG. 3 is a flow diagram that schematically illustrates a method for real-time relationship evaluation, in accordance with an embodiment of the present disclosure. First, rule processor 22 retrieves graph-based rules from rule repository 26 and stores them in memory 24 (step 50). Alternatively or additionally, operator 32 enters rules into entry system 30, which loads the rules to rule memory 24. Operator 32 may define the rule(s) by specifying, for example, (a) the relevant communication types (e.g., email transactions), (b) the activation mode (i.e., pre/post processing), (c) the activation context (i.e., add/update/delete), and (d) the rule triggering criteria, for example whenever rule processor 22 identifies a new communication between two targets.

Rule processor 22 then compares the rules to the relationships stored in graph database 18 (step 52). If any of the rules are met (step 54), then rule processor 22 generates an alert (step 56), which can be presented to operator 32 on display 34 of workstation 30, or stored in alert repository 28 (or both).

When rule processor 22 detects an update to graph database 18 (step 58), the rule processor 22 checks whether any of the rules in memory 24 are relevant to the database update (step 60). If relevant, then the method returns to step 52, where rule processor 22 compares the relevant rules to the update. If, however, either rule processor 22 does not detect a database update (step 58), or processor 22 detects a database update (step 58) but does not identify any rules relevant to the update (step 60), then the method returns to step 58.

Operator 32 views alerts on display 34 of workstation 30. Not every event identified by these rules via an alert points to a situation requiring appropriate action. Therefore, operator 32 can evaluate the alert and proceed accordingly.

Many types of rules for rule engine 20 are based on the distance from suspect entities. Each entity may also contain a linked list of all the suspect entities it is associated with in a distance of up to a specific distance (typically four), and the linked list holds the suspect entity ID and the shortest number of "hops" (i.e., nodes along the path) from that entity to the suspect entity.

Suspect entities in database 18 may contain a linked list of other targets they are related to with distance of up to a specific distance (e.g., seven, so there are four hops from each side of a center mediator). The linked list holds the suspect entity ID as well as the shortest number of hops from that node to the target.

Categories for graph-based rules may comprise, for example, (1) rules not requiring suspect identification, (2) rules requiring suspect identification, (3) rules that rule engine module 20 activates when a new relationship is identified, (4) rules that rule engine 20 activates on existing relationships in database 18, (5) rules that rule engine 20 activates when link analysis system 10 removes a relationship from graph database 18, and (6) rules that rule engine 20 activates prior to data loader module 16 adding a new relationship (i.e., pre-processing rules).

Examples of rules not requiring suspect identification may comprise, for example, (a) identifying internet cafés by detecting "secondary node" entities (such as RADIUS usernames) that are connected to more than X (i.e., a threshold number) "primary node" entities (such as email addresses), (b) identifying a new direct relationship for a specific entity (not necessarily a suspect entity), and (c) identifying an expired relationship for a specific entity.

Examples of rules requiring suspect identification may comprise, for example, (a) identifying an entity that is related to more than X suspect entities, where each suspect entity is a distance of less than Y hops, (b) detecting a new "mediator" entity between two suspect entities within distance X, and (c) detecting a new relationship with a suspect entity, up to a distance of X.

Examples of rules which rule engine module 20 activates when a new relationship is identified may comprise, for example, (a) determining that the distance from a suspect node is reduced, and (b) detecting new shortest path between suspect nodes. Examples of rules that rule engine 20 activates on existing relationships in database 18 may comprise, for example, determining that the level of communication with specific entity increases beyond a predetermined threshold. Examples of rules that rule engine 20 activates when link analysis system 10 removes a relationship from graph database 18 may comprise, for example, detecting an expired connection, where X consecutive days have elapsed without any communication between the two entities (i.e., of the connection).

Finally, examples of rules that rule engine 20 activates prior to data loader module 16 adding a new relationship may comprise, for example, comparing the database update to the aggregated connection profile, and reporting on deviation from the standard behavior. For example, if a known suspect stops using an existing Skype™ ID and switches to a new ID, then a graph-based rule implementing an embodiment of the present disclosure can analyze the VoIP communication habits of the old Skype™ ID, and then by recognizing the entities with which the suspect entity communicates the most, the rule can search for a new Skype™ ID by searching for any entity which is linked (with a minimal link strength threshold) to the previously identified suspect entities.

Although the embodiments described herein refer mainly to users of communication networks, the disclosed techniques can be used with various other types of entities, which may be related to one another. An entity may comprise, for example, an individual, a group of individuals, a communication terminal (e.g., a cellular phone or a computer), a group of terminals or even an entire organization. Other types of entities may comprise, for example, e-mail addresses, Websites, bank accounts or home addresses. In the embodiments described herein, relationships between entities are indicated by communication between the entities over a communication network. In alternative embodiments, any other suitable form of interaction between entities can be used as a relationship indication.

The corresponding structures, materials, acts, and equivalents of all means or steps plus function elements in the claims below are intended to include any structure, material, or act for performing the function in combination with other claimed elements as specifically claimed. The description of the present disclosure has been presented for purposes of illustration and description, but is not intended to be exhaustive or limiting to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

It is intended that the appended claims cover all such features and advantages of the disclosure that fall within the spirit and scope of the present disclosure. As numerous modifications and changes will readily occur to those skilled in the art, it is intended that the disclosure not be limited to the limited number of embodiments described herein. Accordingly, it will be appreciated that all suitable variations, modifications and equivalents may be resorted to, falling within the spirit and scope of the present disclosure.

The invention claimed is:

1. A method, comprising:
   at a first time, accepting a plurality of indications based on interaction among entities, each indication specifying that a respective pair of the entities are related, and constructing based on the indications a data structure representing relationships among respective pairs of the entities, wherein the data structure is suitable for large-scale link analysis;
   at a second time subsequent to the first time, accepting one or more additional indications, and updating the relationships in the data structure based on the additional indications; and
   outputting a notification upon detecting that a rule, which is defined over the relationships and is not met at the first time, is met at the second time; wherein the method is conducted in real time, wherein the notification is output as a graph database, which stores aggregated information about the entities and the relationship between them, wherein the graph database represents each entity as a node, where each node is directly related to one or more other nodes via edges.

2. The method according to claim 1, wherein the interaction comprises communication among the entities over a communication network.

3. The method according to claim 1, wherein the interaction comprises financial transactions among the entities.

4. The method according to claim 1, wherein the indications comprise Call Detail Records (CDRs).

5. The method according to claim 1, wherein the entities comprise at least one entity type selected from a group of types consisting of an individual, a set of individuals, a communication terminal, a plurality of communication terminals, an organization, an e-mail address, a Web-site, a bank account and a home address.

6. The method according to claim 1, wherein updating the relationships in the data structure comprises storing at least a portion of the data structure in Random Access Memory (RAM), and wherein detecting that the rule is met comprises querying at least the portion of the data structure in the RAM.

7. The method according to claim 1, wherein the rule depends on a distance defined as a shortest sequence of interrelated entities that relate a first entity with a second entity.

8. The method according to claim 7, wherein detecting that the rule is met comprises detecting a change in the distance resulting from an update in the relationships occurring between the first time and the second time.

9. The method according to claim 1, wherein the rule is defined with respect to one or more of the entities that are identified as suspects.

10. The method according to claim 9, wherein the rule identifies a given entity as an additional suspect responsively to at least one relationship between the given entity and the suspects.

11. The method according to claim 9, wherein the rule identifies a change in at least one relationship involving the suspects.

12. Apparatus, comprising:
    a memory; and
    a rule processor which is configured to accept, at a first time, a plurality of indications based on interaction among entities, each indication specifying that a respective pair of the entities are related, to construct based on the indications a data structure representing relationships among respective pairs of the entities, wherein the data structure is suitable for large-scale link analysis, to accept, at a second time subsequent to the first time, one or more additional indications, to update the relationships in the data structure based on the additional indications, and to output a notification in real time, wherein the notification is output as a graph database, which stores aggregated information about the entities and the relationship between them, wherein the graph database represents each entity as a node, where each node is directly related to one or more other nodes via edges, upon detecting that a rule, which is defined over the relationships and is not met at the first time, is met at the second time.

13. The apparatus according to claim 12, wherein the interaction comprises communication among the entities over a communication network.

14. The apparatus according to claim 12, wherein the interaction comprises financial transactions among the entities.

15. The apparatus according to claim 12, wherein the indications comprise Call Detail Records (CDRs).

16. The apparatus according to claim 12, wherein the entities comprise at least one entity type selected from a group of types consisting of an individual, a set of individuals, a communication terminal, a plurality of communication terminals, an organization, an e-mail address, a Web-site, a bank account and a home address.

17. The apparatus according to claim 12, and comprising a Random Access Memory (RAM), wherein the rule processor is configured to store at least a portion of the data structure in the RAM, and to detect that the rule is met by querying at least the portion of the data structure in the RAM.

18. The apparatus according to claim 12, wherein the rule depends on a distance defined as a shortest sequence of interrelated entities that relate a first entity with a second entity.

19. The apparatus according to claim 18, wherein the rule processor is configured to detect that the rule is met by detecting a change in the distance resulting from an update in the relationships occurring between the first time and the second time.

20. The apparatus according to claim 12, wherein the rule is defined with respect to one or more of the entities that are identified as suspects.

* * * * *